3,334,002
METHOD OF MANUFACTURING
CAPACITOR STRIPS
Hermann Heywang, Munich, Germany, assignor to Siemens & Halske Aktiengesellschaft, Berlin and Munich, Germany, a corporation of Germany
Filed Nov. 12, 1964, Ser. No. 410,450
4 Claims. (Cl. 156—233)

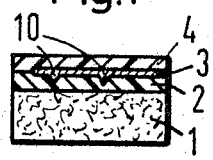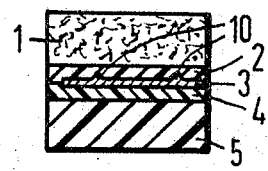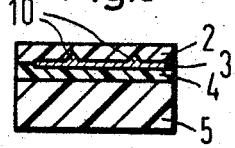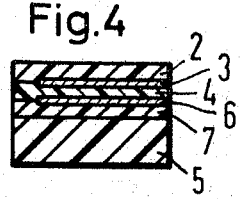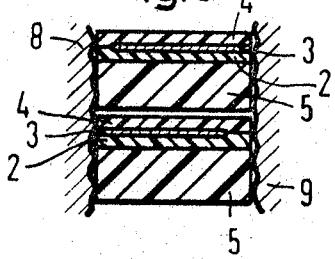

The present invention relates to a method of manufacturing capacitor strips for regenerating electrical capacitors, which consist of a strip or band of insulating material, for example, a paper or plastic foil, two or more varnish layers, and at least one metal layer which is embedded between such varnish layers.

In the metalizing of plastic foils or paper bands the metal vapor penetrates into the pores of the dielectric and forms therein metal peaks which thus project from the metal coating into the dielectric, which reduce the insulation or break-down resistance of the dielectric.

It is known in the art, in order to reduce this effect, to varnish the outer surface of the dielectric strips, but even where the varnishing operation is performed a second time, not all pores in the surface can be eliminated. In particular, those pores which are larger than the thickness of the varnish layer will remain open.

In order to increase the break-down resistance of the dielectric strips, by eliminating, as far as possible, the damaging effect of the formation of metal peaks in the pores of the dielectric, it is proposed, in accordance with the present invention, to provide a first varnish layer on an auxiliary carrier foil, subsequently vaporizing a metal coating onto the same, and on it placing a second varnish layer and afterwards placing an insulating band or strip as a capacitor dielectric upon the upper varnish layer before the latter is completely solidified and is in sufficiently adhesive condition. Finally, the auxiliary carrier foil is removed.

There thus is obtained from a strip or band of insulating material, two varnish layers, and a metal coating, a capacitor strip which has substantially higher break-down resistance than previously known capacitor strips. Such previously known capacitor strips comprised a strip of insulating material and at least one varnish layer on it, upon which was subsequently vaporized a metal coating. While such previous strips contained metal peaks which penetrated into the dielectric strip or band, in accordance with the present method such metal peaks can develop only in the thickness of the first varnish layer. In particular, the dielectric strip as well as the second varnish layer, do not contain any metal peaks and therefore have a high dielectric strength. It is possible by the present method to obtain in capacitors operational field strength characteristics which are substantially improved over those of other capacitors comprising the same thickness of dielectric. It has, for example, heretofore been possible for nine $\mu$m. thick varnished paper to achieve a value of 27 v./$\mu$m., and for a 6 $\mu$m. thick polyethylene terephthalate, a maximum value of 50 v./$\mu$m. On the contrary, a capacitor strip manufactured in accordance with the present invention, which strip consists, for example, of a 3.8 $\mu$m. polyethylene terephthalate, a 1.3 $\mu$m. thick second varnish layer, followed by a metalized coating, and a 1.2 $\mu$m. thick first varnish layer (both of the varnish layers consisting of acetylcellulose) can be loaded with operational field strength values up to 100 v./$\mu$m. If in the inventive arrangement a paper strip is used instead of the polyethylene terephthalate, operational field strength values up to 75 v./$\mu$m. may be achieved.

For improvement of the self-healing properties of a capacitor strip produced in accordance with the method of the present invention, it is suitable to apply at least one varnish layer made from a material which contains in the molecule at least 10% of an oxidation product required for the complete conversion thereof to stable oxidation products. A particularly suitable material is a cellulose ester and a cellulose ether, for example, acetylcellulose, or ethylcellulose. With utilization of such satisfactory regenerable varnish layers, there can be used as the actual dielectric strip, a strip of a material which otherwise is partially or completely unsuitable for self-healing capacitors. Such a material would be, for example, polystyrol or polycarbonate. In similar manner it is also possible, particularly when using dielectric strips of paper, to impregnate the capacitor with an impregnating material which actually possesses disadvantageous properties for self-healing capacitors, for example, chlorinated diphenyl or chlorinated naphthalene.

For some applications it was found advantageous to omit the attachment of the dielectric strip to the second varnish layer, permitting the latter layer to harden, and then applying thereto a further metal coating, followed by the application to the second metal coating of a further varnish layer. The dielectric strip or band is then applied under pressure to such further varnish layer, while the same is still adhesive. The two metal layers which are thus arranged in a capacitor strip, are so disposed that upon suitable contacting of the capacitor coatings, the latter are connected with each other in conductive relation, whereby the second varnish layer is disposed in a field free space of the capacitor. This can be achieved in a simple manner by disposing the conventionally free portion of insulating material remaining at the inner edges of the coatings, at the same side edge. Such an arrangement of a dielectric strip, three varnish layers and two metal layers, was found to be particularly advantageous when the dielectric strip is made of a material with especially good dielectric properties, but with poor regenerative properties, such as, polystyrol, and it is not desired to reduce the favorable dielectric properties of this material by the unfavorable dielectric properties of the varnish layers. In such case it is possible to provide the first and third varnish layers of a material having high dielectric properties, while the second varnish layer, which is in the field-free space, is made of a material which contains in the molecules at least 10% of the oxidation products required for a complete conversion thereof to stable oxidation products, for example, acetylcellulose.

For a further explanation of the invention reference is made to the accompanying drawings in which:

FIG. 1 represents a cross section of a multi-layer band or strip, illustrating the first steps in the method of the invention;

FIG. 2 is a figure similar to FIG. 1, illustrating a following step in the method;

FIG. 3 is a figure similar to FIG. 1, illustrating the capacitor strip following an additional step;

FIG. 4 is a figure similar to FIG. 1, illustrating a modification of the invention; and FIG. 5 illustrates a cross section of a capacitor assembly utilizing two capacitor strips of the type illustrated in FIG. 3.

Referring to FIG. 1, there is illustrated a carrier foil or band 1, upon which is applied a first varnish layer 2, upon which is applied a metal layer 3, and over which is applied a second varnish layer 4. Only the first varnish layer 2 contains metallic peaks 10.

As illustrated in FIG. 2, while the varnish layer 4 is still adhesive, a dielectric strip 5 is applied to the varnish layer 4, utilizing pressure thereon. After removal of the auxiliary carrier foil 1 there is thus formed a capacitor strip as illustrated in FIG. 3. In this capacitor strip the varnish layer 4 and the dielectric strip 5 are completely free of metal peaks 10 and thus form a dielectric of exceptionally high break-down resistance. Such a capacitor strip can, with a further similar capacitor strip, and possibly with the utilization of additional non-metalized dielectric strips, be wound into a capacitor assembly.

FIG. 5 illustrates, in cross section, a capacitor made up of two capacitor strips of the type illustrated in FIG. 3, whereby the metal capacitor layers or coatings 3 are contacted at their corresponding ends by respective contact layers 8 and 9.

FIG. 4 illustrates a further modification of the present invention, in which there is provided on an auxiliary carrier foil, not illustrated (such as the foil 1), a first varnish layer 2, upon which there is subsequently applied a metal coating 3, followed by a second varnish layer 4 on the coating 3. A further metal layer 6 and an additional varnish layer 7 are then applied, following which a dielectric strip 5 is placed upon said further varnish layer 7, utilizing pressure thereon, and following removal of the auixiliary carrier foil 1, there is formed a completed capacitor strip. The free or exposed edges of the metal coatings 3 and 6 are disposed at the same edge of the assembly so that by the use of end contacts in the assembled capacitor the two metal coatings are conductively connected with each other, whereby the varnish layer 4 is in a field-free space of the capacitor. The arrangement as shown in FIG. 4 is particularly advantageous when the dielectric strip 5 is made of a high quality dielectric material, for example, polystyrol, whereby the varnish layers 2 and 7 preferably are made from the same material, while the varnish layer 4 is made of a material which has good regenerative properties, for example, acetylcellulose.

Changes may be made within the scope and spirit of the appended claims which define what is believed to be new and desired to have protected by Letters Patent.

I claim:
1. A method of manufacturing capacitor strips for regenerative electrical capacitors, which comprise a self-supporting insulating strip which form the operative capacitor dielectric, at least two varnish layers, and at least one metal layer embedded between the varnish layers, comprising the steps of applying a first varnish layer upon an auxiliary carrier foil, subsequently vaporizing a metal coating upon said layer, with any resulting metal peaks thereby formed extending into such varnish layer, applying a second varnish layer upon said metal coating, thereafter placing the insulating strip upon the uppermost varnish layer, prior to complete solidification of the latter, while the same is therefore in a sufficiently adhesive condition, preferably applying pressure to said insulating strip and varnish layer, and subsequently removing the auxiliary carrier foil, whereby a multilayer capacitor strip is formed in which the self-supporting dielectric strip is free of any metal peaks produced in said metal-vaporizing step.

2. A method according to claim 1, comprising the additional steps of applying a second metal coating to the second varnish layer, thereafter applying an additional varnish layer upon said second metal coating, and subsequently applying the insulating strip to the last-mentioned varnish layer.

3. A method according to claim 1, wherein the second varnish layer comprises a material which contains in the molecule at least 10% of an oxidation product required for the complete conversion thereof to stable oxidation products.

4. A method according to claim 2, wherein the metal coatings extend to only one side edge of the strip whereby the other edge of the strip is free thereof, and the two metal coatings thus have their exposed edges at the same side edge of the strip.

References Cited
UNITED STATES PATENTS

| | | | |
|---|---|---|---|
| 1,517,370 | 12/1924 | Marbury | 29—25.42 |
| 3,094,650 | 6/1963 | Riegert | 317—258 |
| 3,123,895 | 3/1964 | Henninger et al. | 29—25.42 |
| 3,215,909 | 11/1965 | Schill et al. | 317—258 |
| 3,227,934 | 2/1966 | Schill | 317—260 |
| 3,237,067 | 2/1966 | Schill et al. | 317—259 |

EARL M. BERGERT, *Primary Examiner.*

T. R. SAVOIE, *Assistant Examiner.*